United States Patent
Yoon et al.

(10) Patent No.: US 9,091,858 B2
(45) Date of Patent: Jul. 28, 2015

(54) DISPLAY APPARATUS AND METHOD OF DISPLAYING THREE DIMENSIONAL IMAGE USING THE SAME

(75) Inventors: Il-Yong Yoon, Bucheon-si (KR);
Hae-Young Yun, Suwon-si (KR);
Kyung-Ho Jung, Yongin-si (KR);
Seung-Jun Jeong, Asan-si (KR);
Jin-Hwan Kim, Suwon-si (KR)

(73) Assignee: SAMSUNG DISPLAY CO., LTD. (KR)

( * ) Notice: Subject to any disclaimer, the term of this patent is extended or adjusted under 35 U.S.C. 154(b) by 676 days.

(21) Appl. No.: 13/362,379

(22) Filed: Jan. 31, 2012

(65) Prior Publication Data
US 2012/0229452 A1  Sep. 13, 2012

(30) Foreign Application Priority Data
Mar. 10, 2011  (KR) .................... 10-2011-0021149

(51) Int. Cl.
*H04N 21/236*  (2011.01)
*G02B 27/22*  (2006.01)
*H04N 13/04*  (2006.01)

(52) U.S. Cl.
CPC ........ *G02B 27/2214* (2013.01); *H04N 13/0404* (2013.01)

(58) Field of Classification Search
None
See application file for complete search history.

(56) References Cited

U.S. PATENT DOCUMENTS

| | | | |
|---|---|---|---|
| 2008/0218856 A1* | 9/2008 | Saishu et al. | 359/464 |
| 2009/0235542 A1* | 9/2009 | Miyazaki et al. | 33/286 |
| 2010/0073347 A1* | 3/2010 | Takagi et al. | 345/211 |
| 2010/0182686 A1* | 7/2010 | Fukushima et al. | 359/463 |

FOREIGN PATENT DOCUMENTS

| | | |
|---|---|---|
| JP | 09-043540 A | 2/1997 |
| JP | 2004-258594 A | 9/2004 |
| KR | 100765131 B1 | 10/2007 |

* cited by examiner

*Primary Examiner* — William C Vaughn, Jr.
*Assistant Examiner* — Eileen Adams
(74) *Attorney, Agent, or Firm* — Cantor Colburn LLP

(57) ABSTRACT

A display apparatus includes a display panel, a lens plate and a lens driver. The display panel includes a plurality of unit pixels. The display panel is driven by dividing a single frame into N sub frames. N is a natural number. The lens plate is on the display panel. The lens plate includes a plurality of lenses which convert a two dimensional ("2D") image displayed on the display panel into a three dimensional ("3D") image. The lens driver disposes the lenses at a first position during a first sub frame. The lens driver moves the lenses to a second position from the first position and disposes the lenses at the second position during a second sub frame. The second position is shifted by 1/N of a width of the unit pixel from the first position.

20 Claims, 12 Drawing Sheets

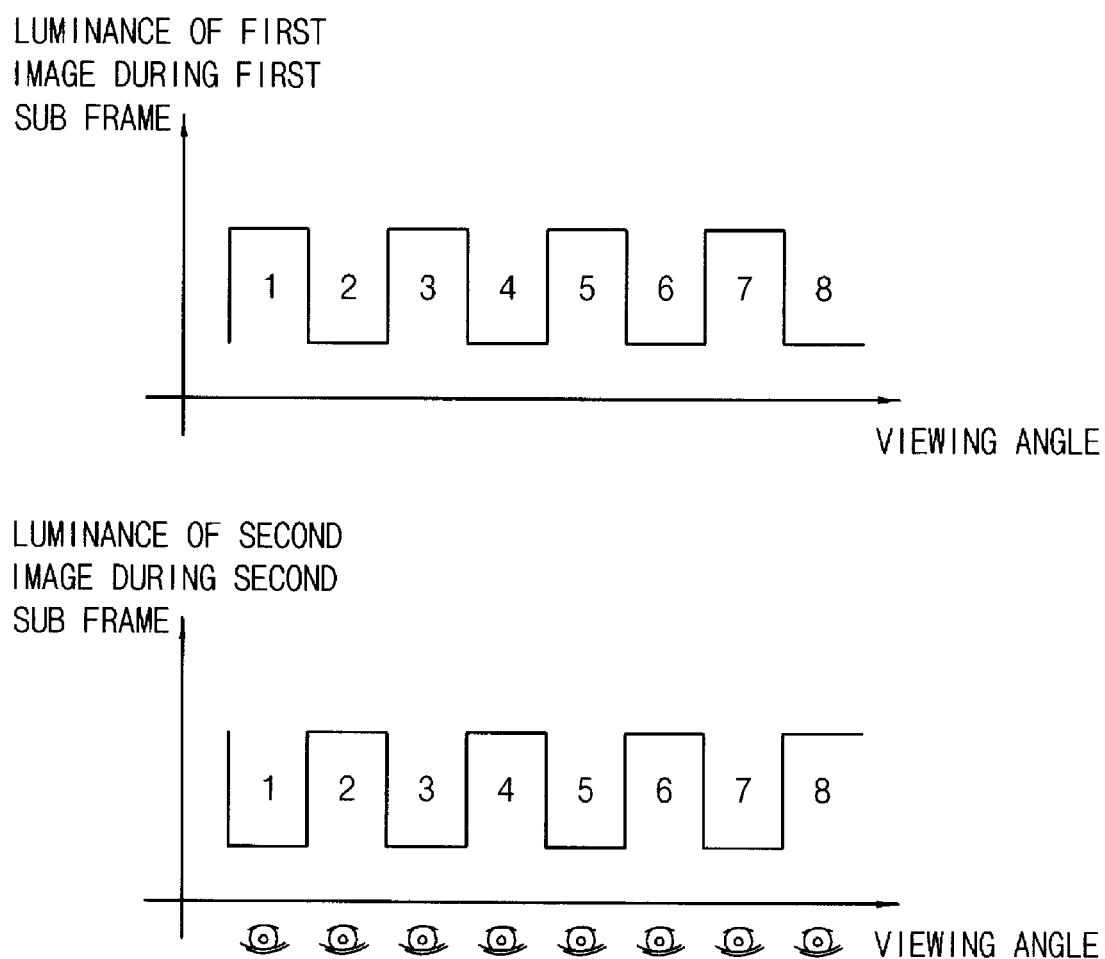

FIG. 14
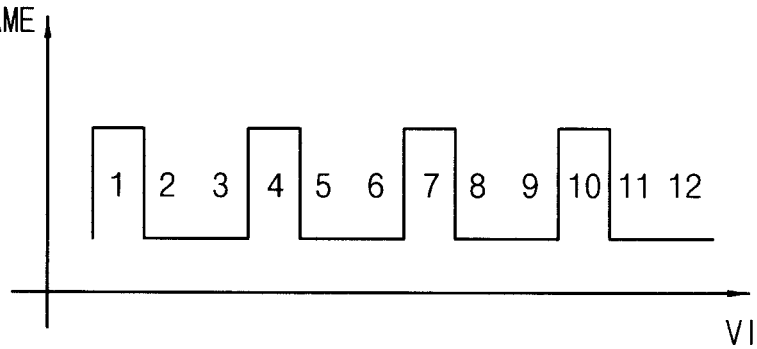
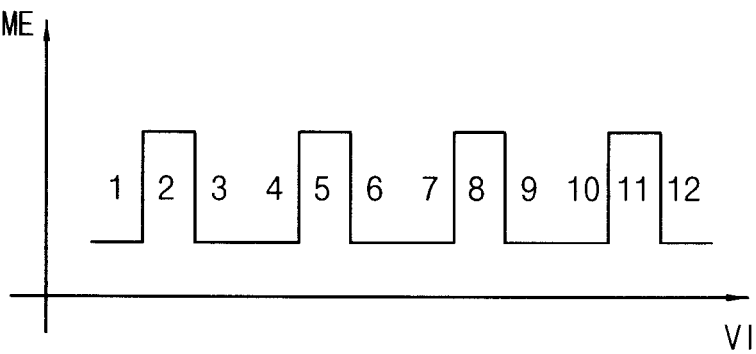
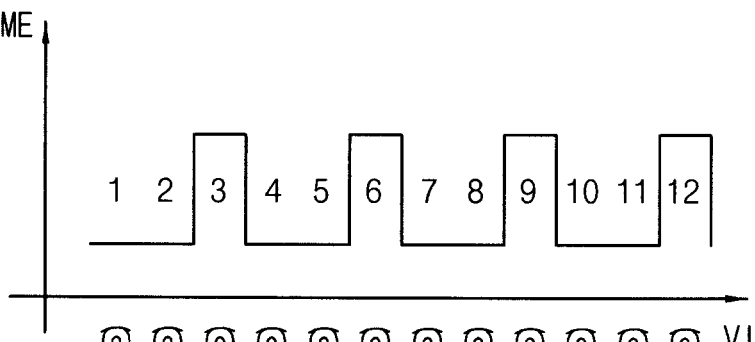

DISPLAY APPARATUS AND METHOD OF DISPLAYING THREE DIMENSIONAL IMAGE USING THE SAME

This application claims priority to Korean Patent Application No. 2011-0021149, filed on Mar. 10, 2011, and all the benefits accruing therefrom under 35 U.S.C. §119, the contents of which are herein incorporated by reference in their entireties.

BACKGROUND OF THE INVENTION

1. Field of the Invention

Exemplary embodiments of the invention relate to a display apparatus and a method of displaying a three dimensional ("3D") image using the display apparatus. More particularly, exemplary embodiments of the invention relate to a display apparatus improving a display quality and a method of displaying a 3D image using the display apparatus.

2. Description of the Related Art

Generally, a liquid crystal display apparatus displays a two dimensional ("2D") image. As a demand for displaying a 3D image have been increasing in video game and movie industries, the liquid crystal display apparatus has been developed to display the 3D image.

Generally, a stereoscopic image display apparatus displays the 3D image using a binocular parallax between two eyes of a human. For example, as two eyes of a human are spaced apart from each other, images viewed at different angles are inputted to a human brain. The human brain mixes the images so that an observer may recognize the stereoscopic image.

The stereoscopic image display device may be divided into a stereoscopic type and an auto-stereoscopic type depending on whether a view wears an extra spectacle or not. The stereoscopic type may include an anaglyph type and a shutter glass type and so on. In the anaglyph type, blue glasses and red glasses may be required for the viewer to wear. In the shutter glass type, a left image and a right image may be temporally divided to be periodically displayed, and a viewer wears glasses which opens and closes a left eye shutter and a right eye shutter in synchronization with the period of the left and right images.

The auto-stereoscopic type may include a lenticular type. In the lenticular type, a lenticular lens having a plurality of focal points is used. The 2D image is refracted by the lenticular lens at the focal points so that the 3D image is displayed.

When the 2D image is converted into the 3D image, a resolution of the liquid crystal display apparatus is decreased so that the display quality may be deteriorated. A crosstalk, which means that a left image is shown in a right eye or a right image is shown in a left eye, may occur. A moiré, which means that a luminance of a display panel is not uniform according to a position in the display panel, also may occur.

BRIEF SUMMARY OF THE INVENTION

Exemplary embodiments of the invention provide a display apparatus to improve a display quality of a three dimensional ("3D") image.

Exemplary embodiments of the invention also provide a method of displaying the 3D image using the display apparatus.

In an exemplary embodiment of a display apparatus according to the invention, the display apparatus includes a display panel, a lens plate and a lens driver. The display panel includes a plurality of unit pixels. The display panel is driven by dividing a single frame into N sub frames. N is a natural number. The lens plate is on the display panel. The lens plate includes a plurality of lenses converting a two dimensional ("2D") image displayed on the display panel into a 3D image. The lens driver disposes the lenses at a first position during a first sub frame. The lens driver moves the lenses to a second position from the first position and disposes the lenses at the second position during a second sub frame. The second position is shifted by 1/N of a width of the unit pixel from the first position.

In the exemplary embodiment, a unit pixel may include an opening portion and a blocking portion. An aperture ratio of the unit pixel, which is defined as a ratio of a width of the opening portion to the width of the unit pixel, may be 1/N.

In the exemplary embodiment, the opening portion and the blocking portion may alternate in a horizontal direction of the display panel. The opening portion and the blocking portion may alternate in a vertical direction of the display panel.

In the exemplary embodiment, the opening portion and the blocking portion may alternate in a horizontal direction of the display panel. A group of the opening portions and a group of the blocking portions may alternate in a vertical direction of the display panel.

In the exemplary embodiment, the display panel may further include a color filter in the opening portion, and a black matrix in the blocking portion.

In the exemplary embodiment, the display apparatus may further includes a barrier part between the display panel and the lens plate. The barrier part may include a plurality of barriers. The display panel may further include a color filter in the opening portion of the unit pixel. A barrier may overlap the blocking portion of the unit pixel.

In the exemplary embodiment, an extending direction of the lens may be substantially parallel to a longitudinal direction of the unit pixel.

In the exemplary embodiment, a moving direction of the lenses may be substantially perpendicular to the extending direction of the lens.

In the exemplary embodiment, a width of the lens may correspond to a total width of the unit pixels.

In the exemplary embodiment, the lens plate may be a liquid crystal lens panel. The lens may be an electric field applied to the liquid crystal lens panel.

In another exemplary embodiment of a display apparatus according to the invention, the display apparatus includes a display panel, a lens plate, an active barrier part and a barrier driver. The display panel includes a plurality of unit pixels. The display panel is driven by dividing a single frame into N sub frames. N is a natural number. The lens plate is on the display panel. The lens plate includes a plurality of lenses converting a 2D image displayed on the display panel into a 3D image. The active barrier part is between the display panel and the lens plate. The active barrier part includes a plurality of active barriers. The barrier driver disposes the active barriers at a first position during a first sub frame. The barrier driver moves the active barriers to a second position from the first position and disposes the active barriers at the second position during a second sub frame. The second position is shifted by 1/N of a width of the unit pixel from the first position.

In the exemplary embodiment, a unit pixel may include an opening portion and a blocking portion. An aperture ratio of the unit pixel, which is defined as a ratio of a width of the opening portion to the width of the unit pixel, may be 1/N.

In the exemplary embodiment, the display panel may include a color filter in the opening portion of the unit pixel. An active barrier may overlap the blocking portion of the unit pixel.

In an exemplary embodiment of a method of displaying a 3D image according to the invention, the method includes providing a first image to a display panel during a first sub frame and a second image to the display panel during a second sub frame, disposing a plurality of lenses at a first position during the first sub frame, the lenses converting the first image into a first 3D image, and moving the lenses to a second position from the first position and disposing the lenses at the second position during the second sub frame, the lenses converting the second image into a second 3D image. The display panel includes a plurality of unit pixels. The display panel is driven by dividing a single frame into N sub frames. N is a natural number. The lenses are on the display panel. The second position is shifted by 1/N of a width of the unit pixel from the first position.

In the exemplary embodiment, a unit pixel may include an opening portion and a blocking portion. An aperture ratio of the unit pixel, which is defined as a ratio of a width of the opening portion to the width of the unit pixel, may be 1/N.

In the exemplary embodiment, the display panel may include a color filter in the opening portion, and a black matrix in the blocking portion In the exemplary embodiment, a barrier part may be between the display panel and the lens plate. The barrier part may include a plurality of barriers. The display panel may further include a color filter in the opening portion of the unit pixel. A barrier may overlap the blocking portion of the unit pixel.

In another exemplary embodiment of a method of displaying a 3D image according to the invention, the method includes providing a first image to a display panel during a first sub frame and a second image to the display panel during a second sub frame, disposing a plurality of active barriers at a first position during the first sub frame, such that the first image is converted into a first 3D image, and moving the active barriers to a second position from the first position and disposing the active barriers at the second position during the second sub frame, such that the second image is converted into a second 3D image. The display panel includes a plurality of unit pixels. The display panel is driven by dividing a single frame into N sub frames. N is a natural number. The active barriers are between the display panel, and a plurality of lenses on the display panel. The second position is shifted by 1/N of a width of the unit pixel from the first position.

In the exemplary embodiment, a unit pixel may include an opening portion and a blocking portion. An aperture ratio of the unit pixel, which is defined as a ratio of a width of the opening portion to the width of the unit pixel, may be 1/N.

In the exemplary embodiment, the display panel may include a color filter in the opening portion of the unit pixel. An active barrier may overlap the blocking portion of the unit pixel.

According to the display apparatus and the method of displaying the 3D image using the display apparatus, a display panel may be driven in a temporal dividing method using a lens or active barrier which moves according to a sub frame. Thus, the number of viewpoints of the 3D image may be increased so that the display quality of the 3D image may be improved.

BRIEF DESCRIPTION OF THE DRAWINGS

The above and other features of the invention will become more apparent by describing in detailed exemplary embodiments thereof with reference to the accompanying drawings, in which:

FIG. 5 is a graph illustrating a luminance of the display panel of FIG. 1 according to a viewing angle during the first and second sub frames;

FIG. 14 is a graph illustrating a luminance of the display panel including the unit pixel of FIG. 12 according to a viewing angle during the first to third sub frames.

DETAILED DESCRIPTION OF THE INVENTION

Figure 1:
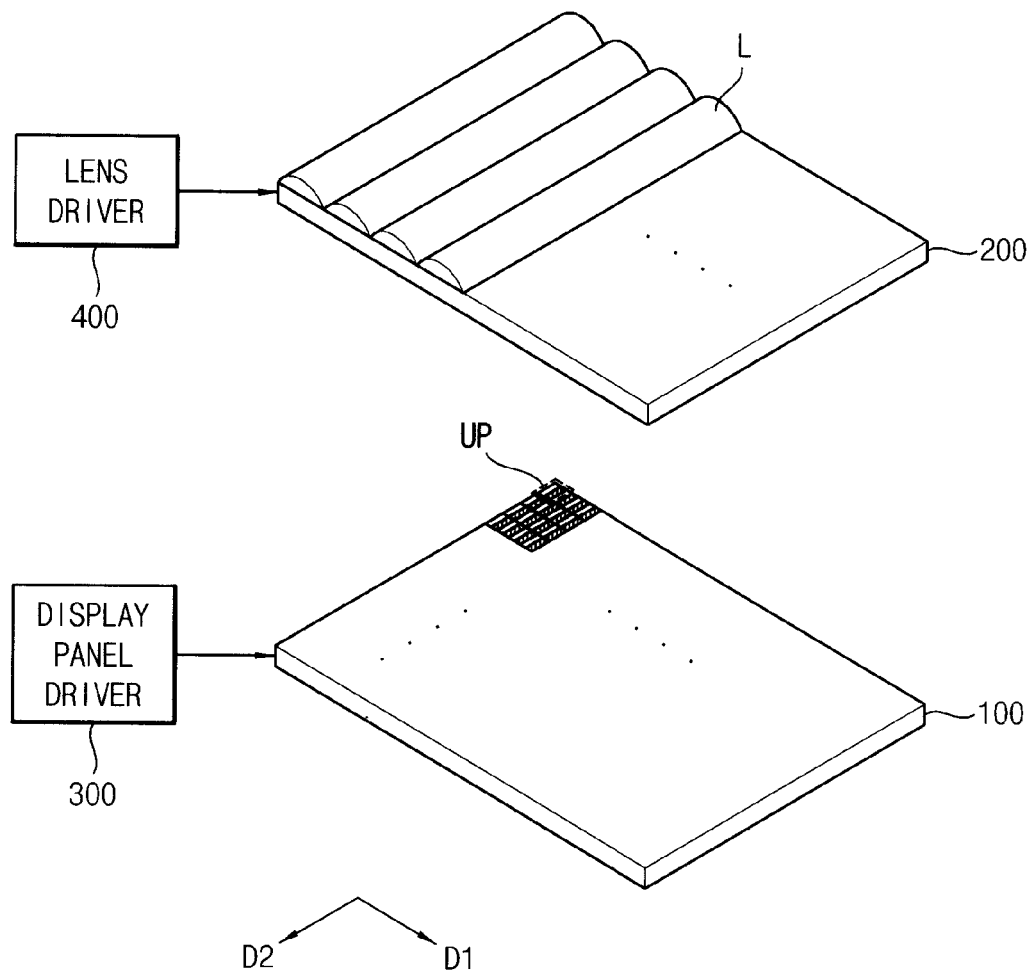
FIG. 1 is a perspective view illustrating an exemplary embodiment of a display apparatus according to the invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. As used herein, "connected" includes physically and/or electrically connected. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, exemplary embodiments of the invention will be described in further detail with reference to the accompanying drawings.

Figure 2:
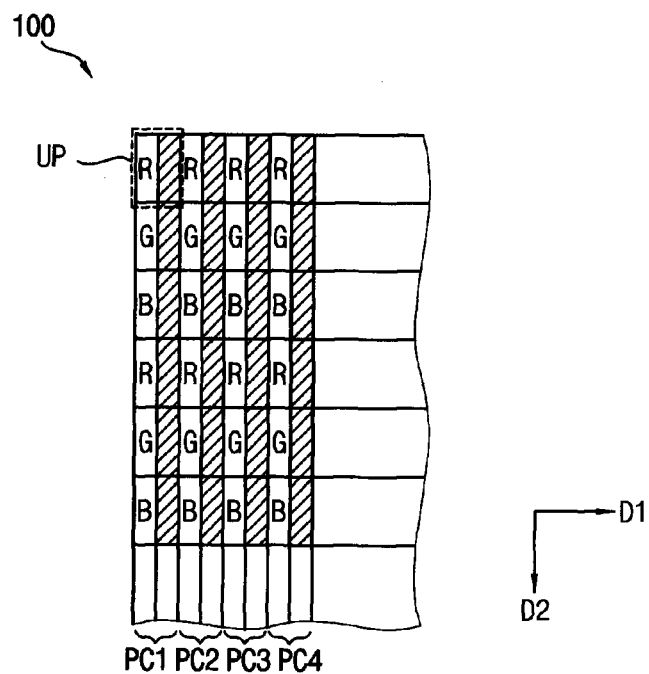
FIG. 2 is a plan view illustrating an exemplary embodiment of a display panel of FIG. 1.

FIG. 1 is a perspective view illustrating an exemplary embodiment of a display apparatus according to the invention. FIG. 2 is a plan view illustrating a display panel 100 of FIG. 1.

Referring to FIGS. 1 and 2, the display apparatus includes the display panel 100, a lens plate 200, a display panel driver 300 and a lens driver 400.

The display panel 100 displays an image. The display panel 100 includes a plurality of unit pixels UP. The unit pixels UP may be in a matrix form. The unit pixels UP are adjacent to each other in a first direction D1 to form a pixel row. The unit pixels UP are adjacent to each other in a second direction D2 crossing the first direction D1 to form a pixel column. The second direction D2 may be substantially perpendicular to the first direction D1.

A first pixel row includes a plurality of red pixels R. A second pixel row adjacent to the first pixel row includes a plurality of green pixels G. A third pixel row adjacent to the second pixel row includes a plurality of blue pixels B.

Alternatively, the first to third pixel rows may include the red, green and blue pixels R, G and B which alternate with each other in the first direction D1.

First to fourth pixel columns PC1, PC2, PC3 and PC4 respectively include the red, green and blue pixels R, G and B which alternate with each other in the second direction D2.

Alternatively, the first to fourth pixel columns PC1, PC2, PC3 and PC4 may respectively include a single colored pixel.

A relatively long side of the unit pixel UP extends in the second direction D2 and a relatively short side of the unit pixel UP extends in the first direction D1 in the illustrated exemplary embodiment. Alternatively, a relatively long side of the unit pixel UP may extend in the first direction D1 and a relatively short side of the unit pixel UP may extend in the second direction D2.

The display panel 100 may include a first substrate (not shown), a second substrate (not shown) and a liquid crystal layer (not shown) between the first and second substrates. The first substrate may include a pixel electrode (not shown), a gate line (not shown) and a data line (not shown). The second substrate may include a common electrode (not shown) and a color filter (not shown).

The lens plate 200 is on the display panel 100, such as on a viewing or emitting side of the display panel 100. The lens plate 200 includes a plurality of lenses L. The lenses L convert a 2D image displayed on the display panel 100 to a 3D image.

The lenses L longitudinally extend along the second direction D2, and are adjacent to each other in the first direction D1. An extending direction of the lens L may be parallel to a vertical (e.g., long) direction of the unit pixel UP.

A width of the lens L in the first direction D1 may correspond to a width of the unit pixels UP in the first direction D1. In one exemplary embodiment, for example, the width of the lens L in the first direction D1 may be substantially equal to a total width of four unit pixels UP in the first direction D1. In this case, the number of the viewpoints of the 3D image may be four.

In another exemplary embodiment, for example, the width of the lens L in the first direction D1 may be substantially equal to a total width of nine unit pixels UP in the first direction D1. In this case, the number of the viewpoints of the 3D image may be nine.

The lenses L may have a convex shape protruding from a planar portion of the lens plate 200 toward an upper direction.

Alternatively, the lens plate 200 may be a liquid crystal lens panel driven by an electric field. In this case, the lenses L do not physically have a convex shape. Optical characteristics of the lenses L are electrically defined by the electric field applied to the liquid crystal lens panel.

The display panel driver 300 is connected to the display panel 100. The display panel driver 300 outputs a signal for driving the display panel 100, to the display panel 100.

The display panel driver 300 drives the display panel 100 by dividing a single frame into N sub frames. Here, N is a natural number.

In one exemplary embodiment, for example, when N is two, the display panel driver 300 generates a first image corresponding to a first sub frame and a second image corresponding to a second sub frame, based on an input image. The display panel driver 300 provides the first image to the display panel 100 during the first sub frame. The display panel driver 300 provides the second image to the display panel 100 during the second sub frame. In one exemplary embodiment, for example, the first image may be a left image, and the second image may be a right image.

When the width of the lens L in the first direction D1 is equal to a total width of four unit pixels UP in the first direction D1, the number of viewpoints increases to four by the lens L, and the number of viewpoints increases to eight by the temporal dividing driving method.

The display panel driver 300 includes a timing controller (not shown), a gate driver (not shown) and a data driver (not shown).

The timing controller generates driving signals to control driving timings of the gate driver and the data driver. The gate driver generates a gate signal in response to the driving signals. The gate driver outputs the gate signal to the gate line of the display panel 100. The data driver generates a data voltage in response to the driving signals. The data driver outputs the data voltage to the data line of the display panel 100.

The display panel driver 300 may further include a frame rate converter (not shown) to convert a frame rate of the input image.

The lens driver 400 is connected to the lens plate 200. The lens driver 400 outputs a signal for driving the lenses L.

The lens driver 400 disposes the lenses L at a first position during the first sub frame. The lens driver 400 disposes the lenses L at a second position during the second sub frame. The second position is shifted by 1/N of the width of the unit pixel UP from the first position.

In one exemplary embodiment, for example, when N is two, the lens driver 400 moves the lenses L by a half of the width of the unit pixel UP to dispose the lenses L at the second position during the second sub frame.

The lens driver 400 may physically move the lens plate 200.

Alternatively, when the lens plate 200 is the liquid crystal lens panel driven by an electric field, the lens driver 400 does not physically move the lens plate 200. By adjusting the electric field applied to the liquid crystal lens panel, the lens plate 200 is driven as the lenses L move.

Figure 3:
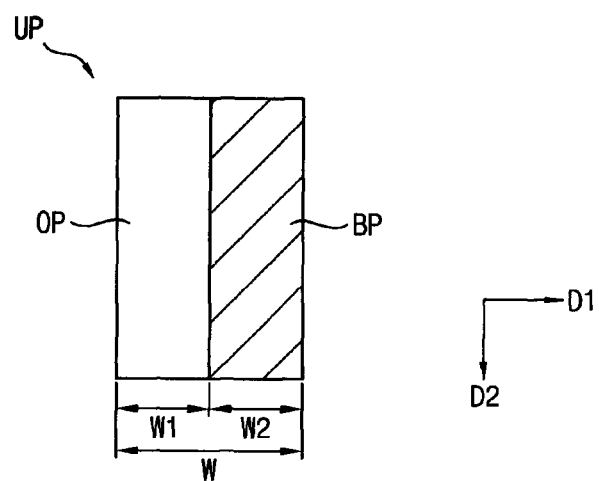
FIG. 3 is a plan view illustrating an exemplary embodiment of a unit pixel of FIG. 1.

FIG. 3 is a plan view illustrating an exemplary embodiment of the unit pixel UP of FIG. 1.

Referring to FIG. 3, the unit pixel UP includes an opening portion OP and a blocking portion BP. The blocking portion BP may be adjacent to the opening portion OP in the first direction D1.

The opening portion OP is defined by the color filter of the display panel 100. The blocking portion BP is defined by a black matrix of the display panel 100. The color filter is in the opening portion OP. The black matrix is in the blocking portion BP.

The opening portion OP has a first width W1 in the first direction D1. The blocking portion BP has a second width W2 in the first direction D1. The width W of the unit pixel UP in the first direction D1 is substantially equal to a sum of the first and second widths W1+W2.

An aperture ratio of the unit pixel UP is defined as a ratio of an area of the opening portion OP to an area of the unit pixel UP. In the illustrated exemplary embodiment, the aperture ratio of the unit pixel UP may be defined as a ratio of the first width W1 of the opening portion OP to the width W of the unit pixel UP. When the display panel 100 is driven by dividing a single frame into N sub frames, the aperture ratio of the unit pixel UP is adjusted to be 1/N.

In the illustrated exemplary embodiment, N is two, so that the aperture ratio W1/W is ½. A ratio between the first width W1 of the opening portion OP and the second width W2 of the blocking portion BP is 1:1.

Figure 4A:
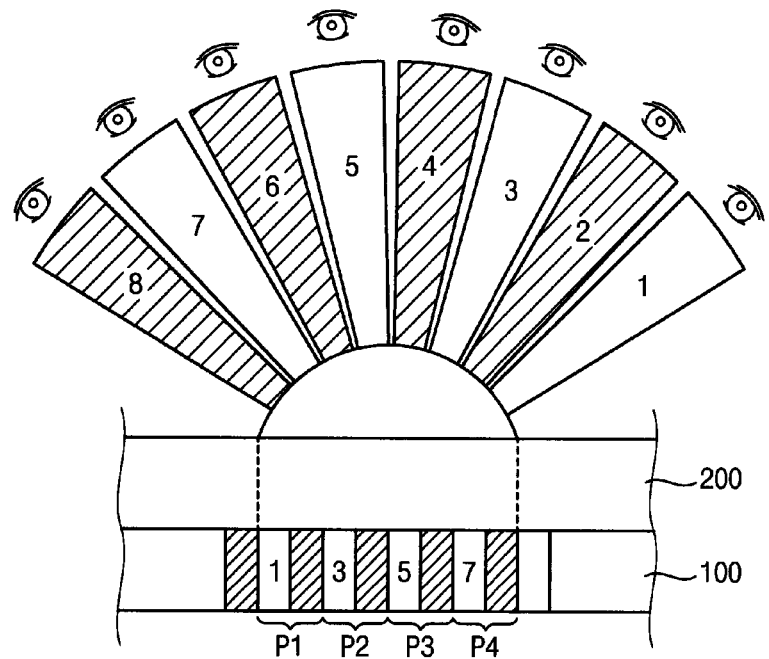
FIG. 4A is a cross-sectional view illustrating an exemplary embodiment of a relative position of the display panel and a lens plate of FIG. 1 during a first sub frame.
Figure 4B:
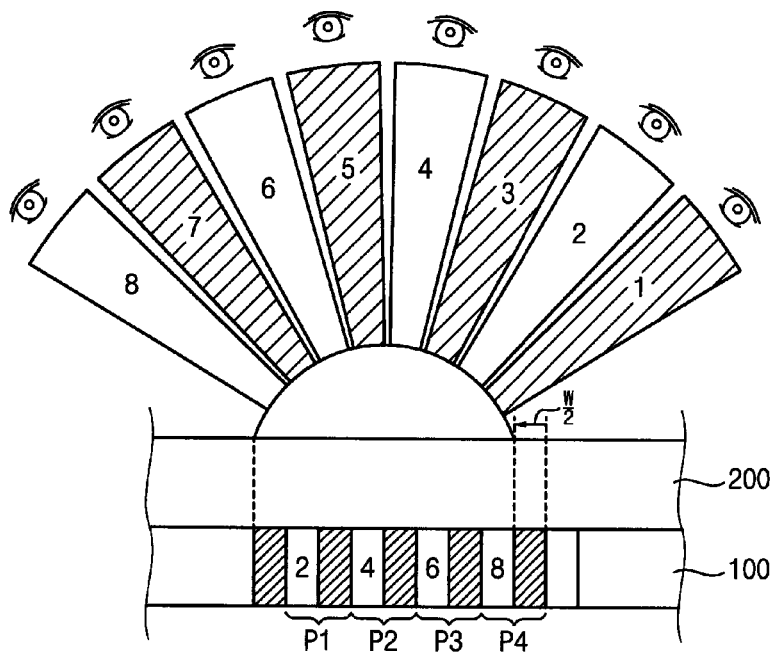
FIG. 4B is a cross-sectional view illustrating an exemplary embodiment of a relative position of the display panel and the lens plate of FIG. 1 during a second sub frame.

FIG. 4A is a cross-sectional view illustrating an exemplary embodiment of a relative position of the display panel 100 and the lens plate 200 of FIG. 1 during the first sub frame. FIG. 4B is a cross-sectional view illustrating an exemplary embodiment of a relative position of the display panel 100 and the lens plate 200 of FIG. 1 during the second sub frame.

Referring to FIGS. 3, 4A and 4B, the display panel 100 includes first to fourth pixels P1, P2, P3 and P4. A width of each of the first to fourth pixels P1 to P4 is W. An aperture ratio of each of the first to fourth pixels P1 to P4 is ½.

The lens plate 200 is on the display panel 100. A single lens of the lens plate 200 has a width corresponding to a total width of four pixels. The lens has a width corresponding to a total width of the first to fourth pixels P1 to P4.

Referring to FIG. 4A, the display panel driver 300 provides the first image to the display panel 100 during the first sub frame. The first image includes first, third, fifth and seventh viewpoint images 1, 3, 5 and 7. The first pixel P1 displays the first viewpoint image 1. The second pixel P2 displays the third viewpoint image 3. The third pixel P3 displays the fifth viewpoint image 5. The fourth pixel P4 displays the seventh viewpoint image 7.

The lens driver 400 disposes the lens at the first position, which corresponds to a boundary of the first pixel P1 and a boundary of the fourth pixel P4.

Referring to FIG. 4B, the display panel driver 300 provides the second image to the display panel 100 during the second sub frame. The second image includes second, fourth, sixth and eighth viewpoint images 2, 4, 6 and 8. The first pixel P1 displays the second viewpoint image 2. The second pixel P2 displays the fourth viewpoint image 4. The third pixel P3 displays the sixth viewpoint image 6. The fourth pixel P4 displays the eighth viewpoint image 8.

The lens driver 400 moves the lens to the second position from the first position to dispose the lens at the second position. The second position is shifted by a half of the width of the unit pixel W/2 from the first position.

Referring to FIGS. 4A and 4B, for example, when a left eye of an observer is at a first viewpoint and a right eye of the observer is at a second viewpoint, the first viewpoint image 1 is viewed to the left eye of the observer through the opening portion during the first sub frame. A black image is viewed to the right eye of the observer by the blocking portion during the first sub frame. The second viewpoint image 2 is viewed to the right eye of the observer through the opening portion during the second sub frame. A black image is viewed to the left eye of the observer by the blocking portion during the second sub frame. Thus, the observer may recognize the 3D image by mixing the first viewpoint image 1 of the first sub frame and the second viewpoint image 2 of the second sub frame.

Referring again to FIGS. 4A and 4B, for example, when a left eye of an observer is at the second viewpoint and a right eye of the observer is at a third viewpoint, the third viewpoint image 3 is viewed to the right eye of the observer through the opening portion during the first sub frame. A black image is viewed to the left eye of the observer by the blocking portion during the first sub frame. The second viewpoint image 2 is viewed to the left eye of the observer through the opening portion during the second sub frame. A black image is viewed to the right eye of the observer by the blocking portion during the second sub frame. Thus, the observer may recognize the 3D image by mixing the third viewpoint image 3 of the first sub frame and the second viewpoint image 2 of the second sub frame.

FIG. 5 is a graph illustrating a luminance of the display panel 100 of FIG. 1 according to a viewing angle during the first and second sub frames.

Referring to FIGS. 4A, 4B and 5, relatively bright images are viewed at the first, third, fifth and seventh viewpoints through the opening portion during the first sub frame. The black images are viewed at the second, fourth, sixth and eighth viewpoints by the blocking portion during the first sub frame.

Relatively bright images are viewed at the second, fourth, sixth and eighth viewpoints through the opening portion during the second sub frame. The black images are viewed at the first, third, fifth and seventh viewpoints by the blocking portion during the second sub frame.

In FIG. 3, the ratio between the first width W1 of the opening portion OP and the second width W2 of the blocking portion BP is 1:1, so that the relatively bright image and the black image are repeated in a uniform cycle at each of the viewpoints. Accordingly, the display apparatus of the illustrated exemplary embodiment displays the 3D image like a display apparatus using a shutter glass. Thus, the display apparatus of the illustrated exemplary embodiment may reduce or effectively prevent crosstalk where a left image is shown in a right eye or a right image is shown in a left eye.

In addition, an average of a luminance of the first image during the first sub frame and a luminance of the second image during the second sub frame is substantially uniform at any viewpoints, so that the display apparatus of the illustrated exemplary embodiment may reduce or effectively prevent the moiré where a luminance of the display panel 100 is not uniform according to the viewpoint.

According to the illustrated exemplary embodiment, P viewpoints may be generated by the lens, and N viewpoints may be generated by the temporal dividing driving method so that P×N viewpoints of the display apparatus may be generated. Thus, the display quality of the 3D image and the viewing angle of the display apparatus may be improved.

In addition, the aperture of the unit pixel is adjusted according to the temporal dividing driving method so that the crosstalk and the moiré may be reduced or effectively prevented. Thus, the display quality of the 3D image may be improved.

Figure 6:
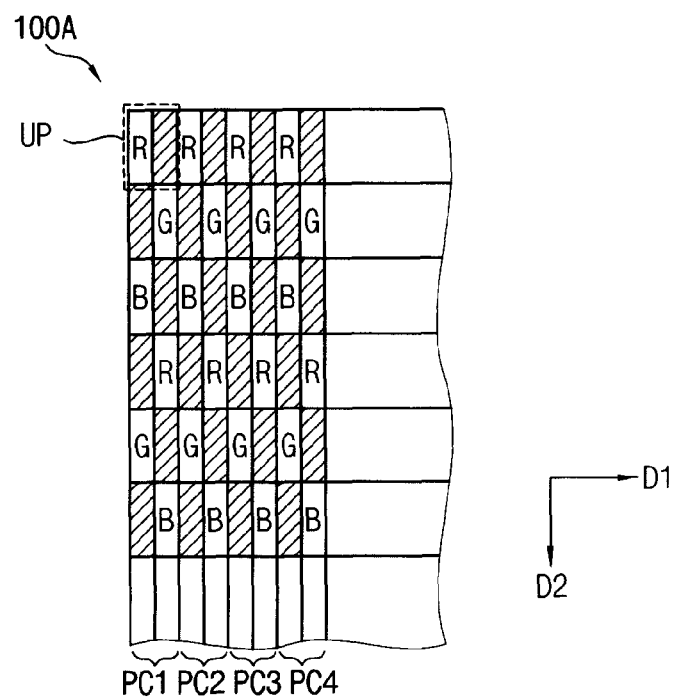
FIG. 6 is a plan view illustrating another exemplary embodiment of a display panel of a display apparatus according to the invention.

FIG. 6 is a plan view illustrating another exemplary embodiment of a display panel of a display apparatus according to the invention.

A display apparatus and a method of displaying a 3D image according to the illustrated exemplary embodiment is substantially the same as the display apparatus and the method of displaying the 3D image of the previous exemplary embodiment explained referring to FIGS. 1 to 5 except for a pixel structure of the display panel. Thus, the same reference numerals will be used to refer to the same or like parts as those described in the previous exemplary embodiment of FIGS. 1 to 5 and any repetitive explanation concerning the above elements will be omitted.

Referring to FIG. 6, the display panel 100A includes a plurality of unit pixels UP. The unit pixels UP may be in a matrix form. The unit pixels UP are adjacent to each other in a first direction D1 to form a pixel row. The unit pixels UP are adjacent to each other in a second direction D2 crossing the first direction D1, to form a pixel column. The second direction D2 may be substantially perpendicular to the first direction D1.

A first pixel row includes a plurality of red pixels R. A second pixel row includes a plurality of green pixels G. A third pixel row includes a plurality of blue pixels B.

The unit pixel UP includes an opening portion and a blocking portion. The blocking portion may be adjacent to the opening portion in the first direction D1.

In the display panel 100A, the opening portion and the blocking portion alternate with each other in the first direction D1. The first direction D1 may correspond to a horizontal direction of the display panel 100A. In the display panel 100A, the opening portion and the blocking portion alternate with each other in the second direction D2. The second direction D2 may correspond to a vertical direction of the display panel 100A.

In one exemplary embodiment, for example, when a left eye of an observer is at a left column of a first pixel column PC1 and a right eye of the observer is at a right column of the first pixel column PC1, a red image R, a black image, a blue image B, a black image, a green image G and a black image are viewed to the left eye of the observer according to the left column of the first pixel column PC1 during the first sub frame. A black image, a green image G, a black image, a red image R, a black image and a blue image B are viewed to the right eye of the observer according to the right column of the first pixel column PC1 during the first sub frame. In the second sub frame, the lens is shifted by a half of the width of the unit pixel UP. Accordingly, a black image, a green image G, a black image, a red image R, a black image and a blue image B are viewed to the left eye of the observer during the second sub frame. A red image R, a black image, a blue image B, a black image, a green image G and a black image are viewed to the right eye of the observer during the second sub frame.

According to the illustrated exemplary embodiment, the opening portion and the blocking portion alternate along the pixel column so that a flickering due to the temporal dividing driving method may be reduced or effectively prevented.

Figure 7:
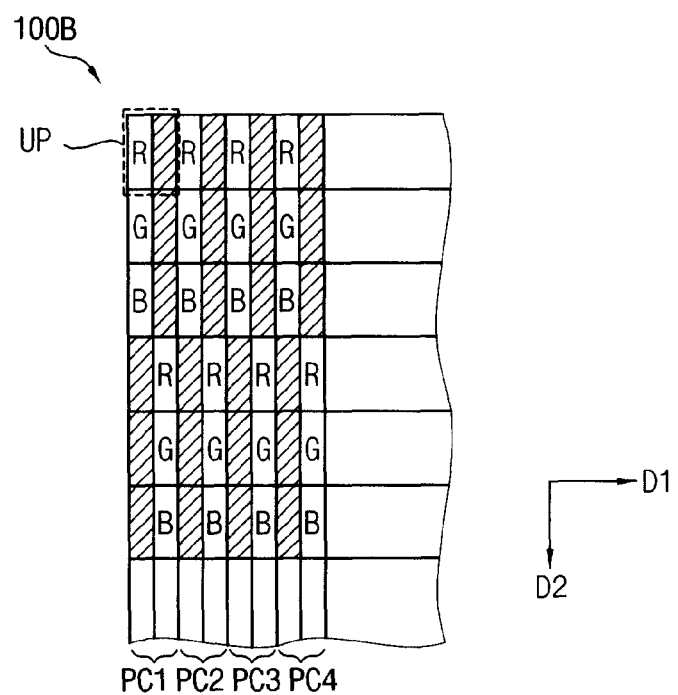
FIG. 7 is a plan view illustrating still another exemplary embodiment of a display panel of a display apparatus according to the invention.

FIG. 7 is a plan view illustrating still another exemplary embodiment of a display panel of a display apparatus according to the invention.

A display apparatus and a method of displaying a 3D image according to the illustrated exemplary embodiment is substantially the same as the display apparatus and the method of displaying the 3D image of the previous exemplary embodiment explained referring to FIGS. 1 to 5 except for a pixel structure of the display panel. Thus, the same reference numerals will be used to refer to the same or like parts as those described in the previous exemplary embodiment of FIGS. 1 to 5 and any repetitive explanation concerning the above elements will be omitted.

Referring to FIG. 7, the display panel 100B includes a plurality of unit pixels UP. The unit pixels UP may be in a matrix form. The unit pixels UP are adjacent to each other in a first direction D1 to form a pixel row. The unit pixels UP are adjacent to each other in a second direction D2 crossing the first direction D1 to form a pixel column. The second direction D2 may be substantially perpendicular to the first direction D1.

A first pixel row includes a plurality of red pixels R. A second pixel row includes a plurality of green pixels G. A third pixel row includes a plurality of blue pixels B.

The unit pixel UP includes an opening portion and a blocking portion. The blocking portion may be adjacent to the opening portion in the first direction D1.

In the display panel 100B, the opening portion and the blocking portion alternate with each other in the first direction D1. The first direction D1 may correspond to a horizontal direction of the display panel 100B. In the display panel 100B, a group of the opening portions and a group of the blocking portions alternate with each other in the second direction D2. The second direction D2 may correspond to a vertical direction of the display panel 100B. In the illustrated embodiment, for example, three opening portions a first group and three blocking portions of a second group alternate with each other in the second direction D2.

In one exemplary embodiment, for example, when a left eye of an observer is at a left column of a first pixel column PC1 and a right eye of the observer is at a right column of the first pixel column PC1, a red image R, a green image G, a blue image B, a black image, a black image and a black image are viewed to the left eye of the observer according to the left column of the first pixel column PC1 during the first sub frame. A black image, a black image, a black image, a red image R, a green image G and a blue image B are viewed to the right eye of the observer according to the right column of the first pixel column PC1 during the first sub frame. In the second sub frame, the lens is shifted by a half of the width of the unit pixel UP. Accordingly, a black image, a black image, a black image, a red image R, a green image G and a blue image B are viewed to the left eye of the observer during the second sub frame. A red image R, a green image G, a blue image B, a black image, a black image and a black image are viewed to the right eye of the observer during the second sub frame.

According to the illustrated exemplary embodiment, a group of the opening portions and a group of the blocking portions alternate along the pixel column so that a flickering due to the temporal dividing driving method may be reduced or effectively prevented.

Figure 8:
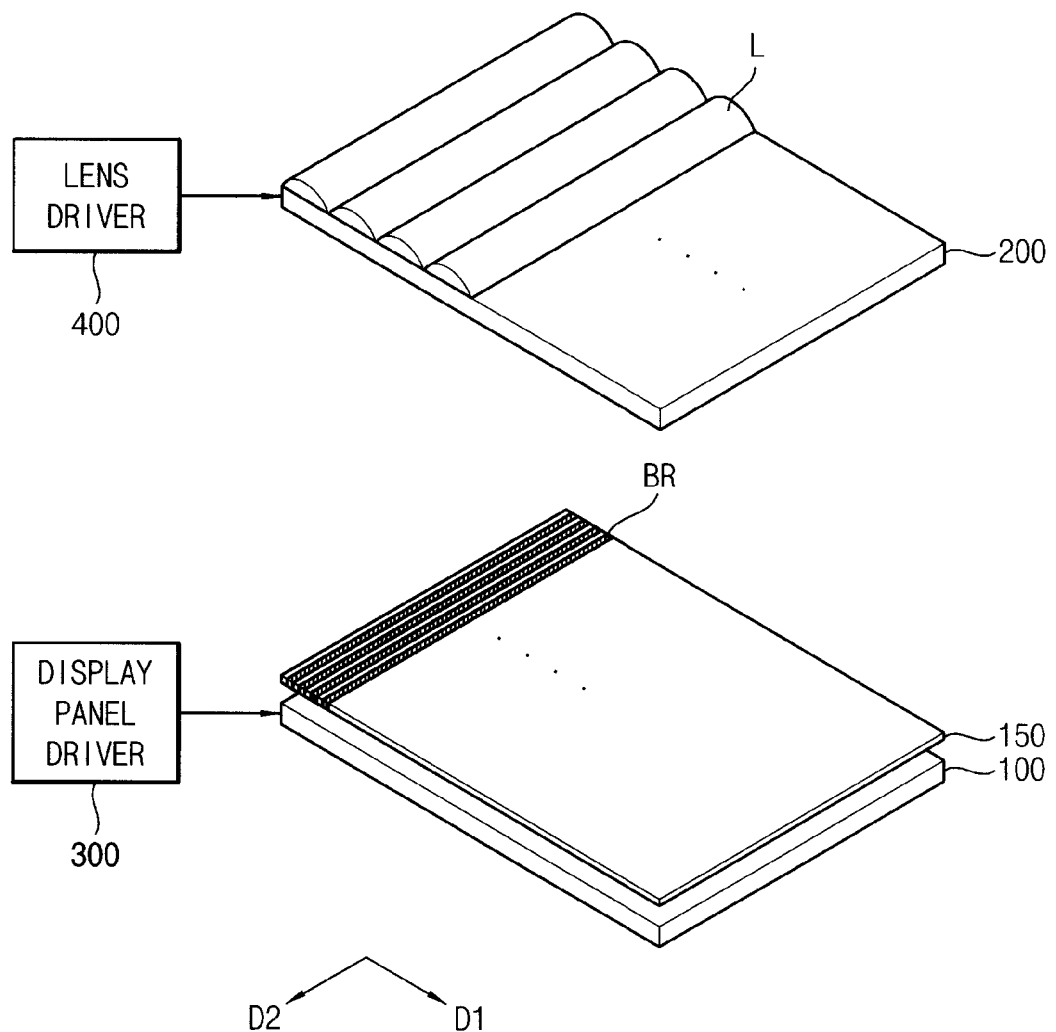
FIG. 8 is a perspective view illustrating another exemplary embodiment of a display apparatus according to the invention.

FIG. 8 is a perspective view illustrating another exemplary embodiment of a display apparatus according to the invention.

A display apparatus and a method of displaying a 3D image according to the illustrated exemplary embodiment is substantially the same as the display apparatus and the method of displaying the 3D image of the previous exemplary embodiment explained referring to FIGS. 1 to 5 except for a barrier part defining a blocking portion. Thus, the same reference numerals will be used to refer to the same or like parts as those described in the previous exemplary embodiment of FIGS. 1 to 5 and any repetitive explanation concerning the above elements will be omitted.

Referring to FIG. 8, the display apparatus includes the display panel 100, a barrier part 150, the lens plate 200, a display panel driver 300 and the lens driver 400.

The display panel 100 displays an image. The display panel 100 includes a plurality of unit pixels. The unit pixels may be in a matrix form.

The lens plate 200 is on the display panel 100. The lens plate 200 includes a plurality of lenses L. The lenses L convert the 2D image displayed on the display panel 100 to the 3D image.

The lenses L extend along the second direction D2, and are adjacent to each other in the first direction D1. An extending direction of the lens L may be parallel to a vertical direction of the unit pixel.

The barrier part 150 is between the display panel 100 and the lens plate 200. The barrier part 150 includes a plurality of barriers BR covering a portion of the display panel 100.

The barriers BR respectively have a bar shape longitudinally extending along the second direction D2, and are adjacent to each other in the first direction D1.

The unit pixel includes an opening portion and the blocking portion. The blocking portion may be adjacent to the opening portion in the first direction D1.

The opening portion is defined by a color filter of the display panel 100. The blocking portion is defined by the barrier BR of the barrier part 150. The color filter is in the opening portion. The barrier BR is in the blocking portion.

An aperture ratio of the unit pixel is defined as a ratio of an area of the opening portion to an area of the unit pixel. In the illustrated exemplary embodiment, the aperture ratio of the unit pixel may be defined as a ratio of a first width of the opening portion to a width of the unit pixel. When the display panel 100 is driven by dividing a single frame into N sub frames, the aperture ratio of the unit pixel is adjusted to be 1/N.

In the illustrated exemplary embodiment, N is two so that the aperture ratio is ½. A ratio between the first width of the opening portion and a second width of the blocking portion is 1:1.

Figure 9A:
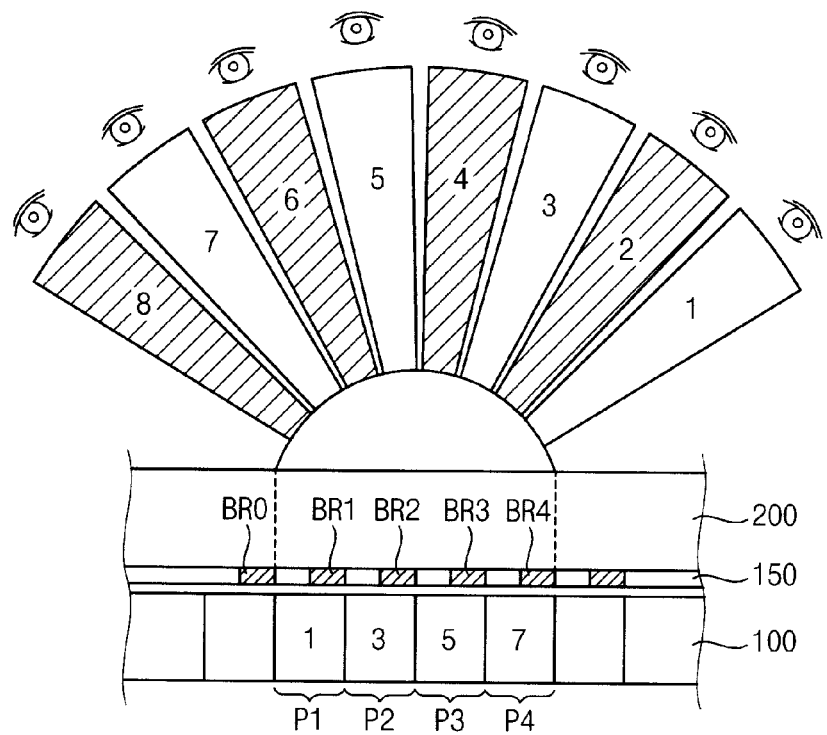
FIG. 9A is a cross-sectional view illustrating an exemplary embodiment of a relative position of a display panel, a barrier part and a lens plate of FIG. 8 during a first sub frame.
Figure 9B:
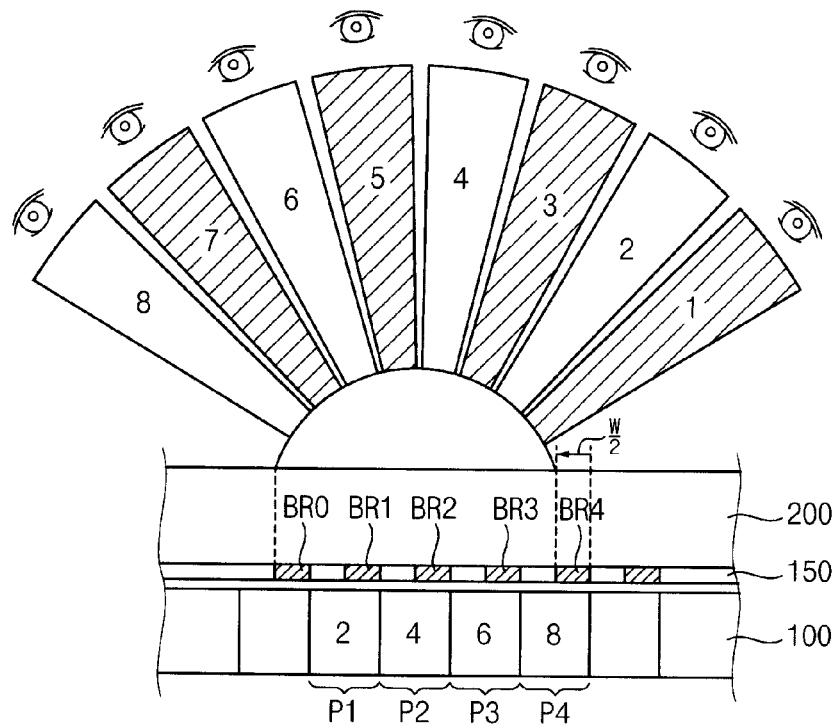
FIG. 9B is a cross-sectional view illustrating an exemplary embodiment of a relative position of the display panel, the barrier part and the lens plate of FIG. 8 during a second sub frame.

FIG. 9A is a cross-sectional view illustrating an exemplary embodiment of a relative position of the display panel 100, the barrier part 150 and the lens plate 200 of FIG. 8 during a first sub frame. FIG. 9B is a cross-sectional view illustrating an exemplary embodiment of a relative position of the display panel 100, the barrier part 150 and the lens plate 200 of FIG. 8 during a second sub frame.

Referring to FIGS. 8, 9A and 9B, the display panel 100 includes first to fourth pixels P1, P2, P3 and P4. The barrier part 150 is on the display panel 100. The barrier part 150 includes the barriers BR1, BR2, BR3 and BR4. The barriers BR1 to BR4 define the blocking portions of the first to fourth pixels P1 to P4. A width of each of the first to fourth pixels P1 to P4 is W. An aperture ratio of each of the first to fourth pixels P1 to P4 is ½. The lens plate 200 is on the barrier part 150.

Referring to FIG. 9A, the display panel driver 300 provides the first image to the display panel 100 during the first sub frame. The first image includes first, third, fifth and seventh viewpoint images 1, 3, 5 and 7.

The lens driver 400 disposes the lens at a first position, which corresponds to a boundary of the first pixel P1 and a boundary of the fourth pixel P4.

Referring to FIG. 9B, the display panel driver 300 provides the second image to the display panel 100 during the second sub frame. The second image includes second, fourth, sixth and eighth viewpoint images 2, 4, 6 and 8.

The lens driver 400 moves the lens to a second position from the first position to dispose the lens at the second position. The second position is shifted by a half of the width of the unit pixel W/2 from the first position.

Referring to FIGS. 9A and 9B, for example, when a left eye of an observer is at a first viewpoint and a right eye of the observer is at a second viewpoint, the first viewpoint image 1 is viewed to the left eye of the observer through the opening portion during the first sub frame. A black image is viewed to the right eye of the observer by the blocking portion during the first sub frame. The second viewpoint image 2 is viewed to the right eye of the observer through the opening portion during the second sub frame. A black image is viewed to the left eye of the observer by the blocking portion during the second sub frame. Thus, the observer may recognize the 3D image by mixing the first viewpoint image 1 of the first sub frame and the second viewpoint image 2 of the second sub frame.

According to the illustrated exemplary embodiment, the display apparatus further includes the barrier part 150 to adjust a width of the blocking portion so that the 3D image may be displayed using a conventional display panel for displaying the 2D image.

Figure 10:
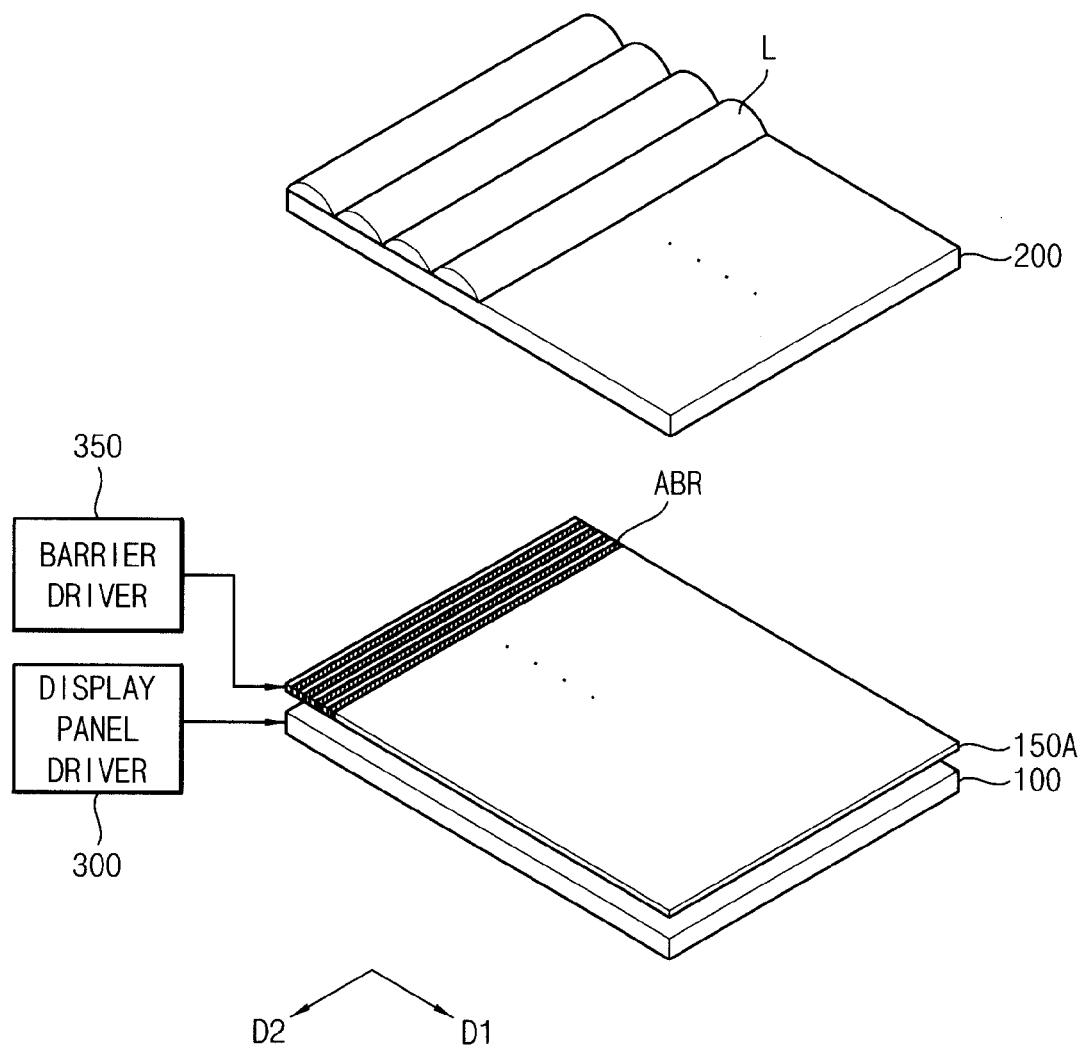
FIG. 10 is a perspective view illustrating still another exemplary embodiment of a display apparatus according to the invention.

FIG. 10 is a perspective view illustrating still another exemplary embodiment of a display apparatus according to the invention.

A display apparatus and a method of displaying a 3D image according to the illustrated exemplary embodiment is substantially the same as the display apparatus and the method of displaying the 3D image of the previous exemplary embodiment explained referring to FIGS. 1 to 5 except for an active barrier part including an active barrier to define a blocking portion and a barrier driver moving the active barrier. Thus, the same reference numerals will be used to refer to the same or like parts as those described in the previous exemplary embodiment of FIGS. 1 to 5 and any repetitive explanation concerning the above elements will be omitted.

Referring to FIG. 10, the display apparatus includes the display panel 100, an active barrier part 150A, the lens plate 200, the display panel driver 300 and a barrier driver 350.

The display panel 100 displays an image. The display panel 100 includes a plurality of unit pixels. The unit pixels may be in a matrix form.

The lens plate 200 is on the display panel 100. The lens plate 200 includes a plurality of lenses L. The lenses L convert the 2D image displayed on the display panel 100 to the 3D image.

The lenses L extend along the second direction D2, and are adjacent to each other in the first direction D1. An extending direction of the lens L may be parallel to a vertical direction of the unit pixel.

The active barrier part 150A is between the display panel 100 and the lens plate 200. The active barrier part 150A includes a plurality of active barriers ABR covering a portion of the display panel 100.

The active barriers ABR respectively have a bar shape longitudinally extending along the second direction D2, and are adjacent to each other in the first direction D1.

The barrier driver 350 is connected to the active barrier part 150A. The barrier driver 350 outputs a signal for driving the active barriers ABR, to the active barrier part 150A.

The barrier driver 350 disposes the active barriers ABR at a first position during the first sub frame. The barrier driver 350 disposes the active barriers ABR at a second position during the second sub frame. The second position is shifted by 1/N of the width of the unit pixel from the first position.

In one exemplary embodiment, for example, when N is two, the barrier driver 350 moves active barriers ABR by a half of the width of the unit pixel to dispose the active barriers ABR at the second position during the second sub frame.

The unit pixel includes an opening portion and the blocking portion. The blocking portion may be adjacent to the opening portion in the first direction D1.

The opening portion is defined by a color filter of the display panel 100. The blocking portion is defined by the active barrier ABR of the active barrier part 150A. The color filter is in the opening portion. The active barrier ABR is in the blocking portion.

An aperture ratio of the unit pixel is defined as a ratio of an area of the opening portion to an area of the unit pixel. In the illustrated exemplary embodiment, the aperture ratio of the unit pixel may be defined as a ratio of a first width of the opening portion to a width of the unit pixel. When the display panel 100 is driven by dividing a single frame into N sub frames, the aperture ratio of the unit pixel is adjusted to be 1/N.

In the illustrated exemplary embodiment, N is two so that the aperture ratio is ½. A ratio between the first width of the opening portion and a second width of the blocking portion is 1:1.

Figure 11A:
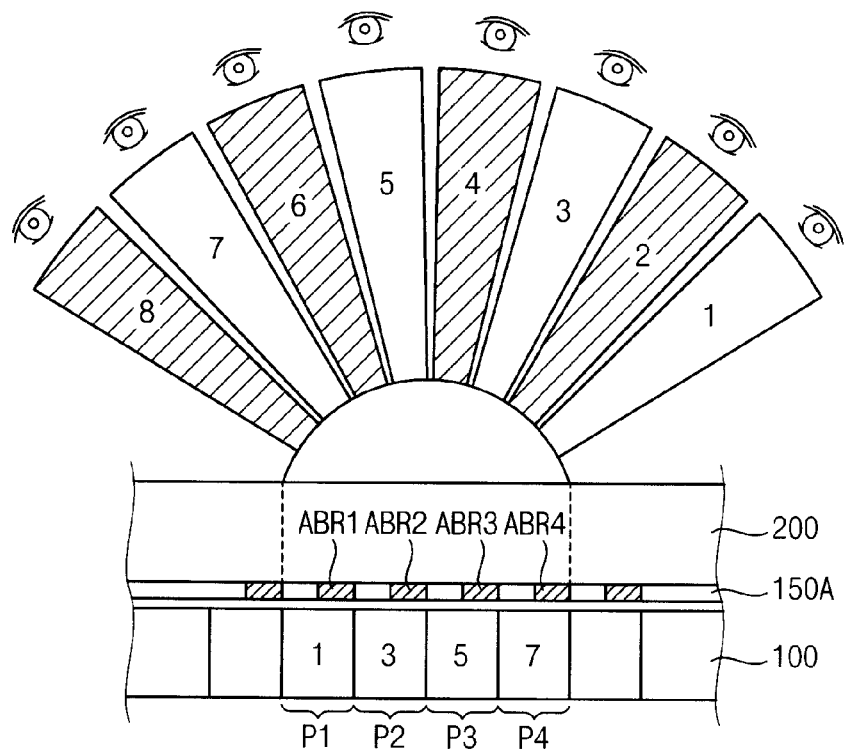
FIG. 11A is a cross-sectional view illustrating an exemplary embodiment of a relative position of a display panel, an active barrier part and a lens plate of FIG. 10 during a first sub frame.
Figure 11B:
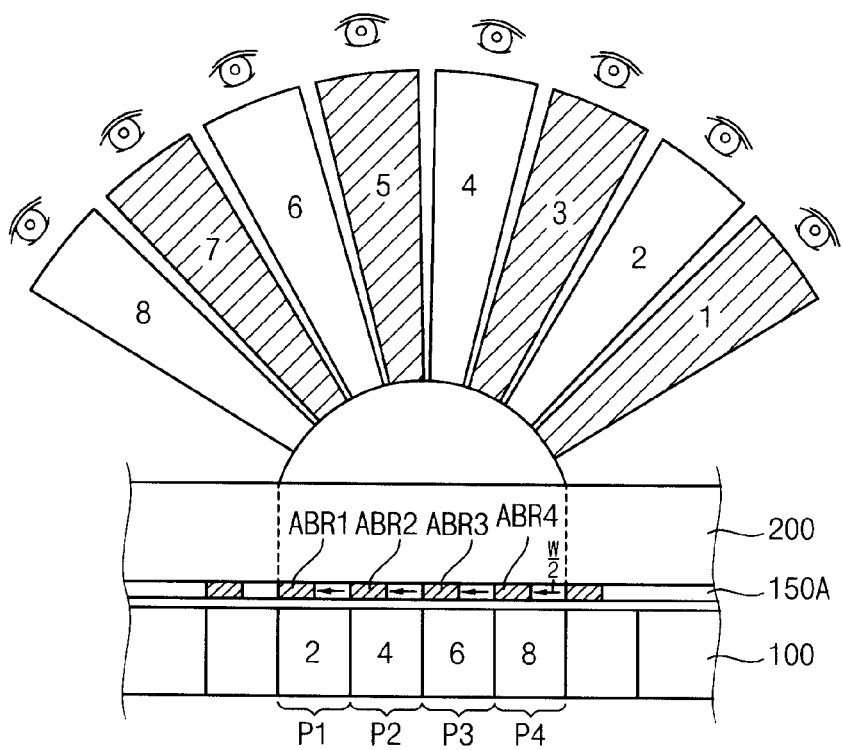
FIG. 11B is a cross-sectional view illustrating an exemplary embodiment of a relative position of the display panel, the active barrier part and the lens plate of FIG. 10 during a second sub frame.

FIG. 11A is a cross-sectional view illustrating an exemplary embodiment of a relative position of the display panel 100, the active barrier part 150A and the lens plate 200 of FIG. 10 during a first sub frame. FIG. 11B is a cross-sectional view illustrating an exemplary embodiment of a relative position of the display panel 100, the active barrier part 150A and the lens plate 200 of FIG. 10 during a second sub frame.

Referring to FIGS. 10, 11A and 11B, the display panel 100 includes first to fourth pixels P1, P2, P3 and P4. The active barrier part 150A is on the display panel 100. The active barrier part 150A includes the barriers ABR1, ABR2, ABR3 and ABR4. The active barriers ABR1 to ABR4 define the blocking portions of the first to fourth pixels P1 to P4. A width of each of the first to fourth pixels P1 to P4 is W. An aperture ratio of each of the first to fourth pixels P1 to P4 is ½. The lens plate 200 is on the active barrier part 150A.

Referring to FIG. 11A, the display panel driver 300 provides the first image to the display panel 100 during the first sub frame. The first image includes first, third, fifth and seventh viewpoint images 1, 3, 5 and 7.

The barrier driver 350 disposes the active barriers ABR1 to ABR4 at a first position, which corresponds to first portions of the first to fourth pixels P1 to P4. In one exemplary embodiment, for example, the first position may correspond to right half portions of the first to fourth pixels P1 to P4.

Referring to FIG. 11B, the display panel driver 300 provides the second image to the display panel 100 during the second sub frame. The second image includes second, fourth, sixth and eighth viewpoint images 2, 4, 6 and 8.

The barrier driver 350 moves the active barriers ABR1 to ABR4 to a second position from the first position to dispose the active barriers ABR1 to ABR4 at the second position. The second position is shifted by a half of the width of the unit pixel W/2 from the first position. In one exemplary embodiment, for example, the second position may correspond to left half portions of the first to fourth pixels P1 to P4.

Referring to FIGS. 11A and 11B, for example, when a left eye of an observer is at a first viewpoint and a right eye of the observer is at a second viewpoint, the first viewpoint image 1 is viewed to the left eye of the observer through the opening portion during the first sub frame. A black image is viewed to the right eye of the observer by the blocking portion during the first sub frame. The second viewpoint image 2 is viewed to the right eye of the observer through the opening portion during the second sub frame. A black image is viewed to the left eye of the observer by the blocking portion during the second sub frame. Thus, the observer may recognize the 3D image by mixing the first viewpoint image 1 of the first sub frame and the second viewpoint image 2 of the second sub frame.

According to the illustrated exemplary embodiment, the display apparatus further includes the active barrier part 150A to adjust a width of the blocking portion so that the 3D image may be displayed using a conventional display panel for displaying the 2D image.

Figure 12:
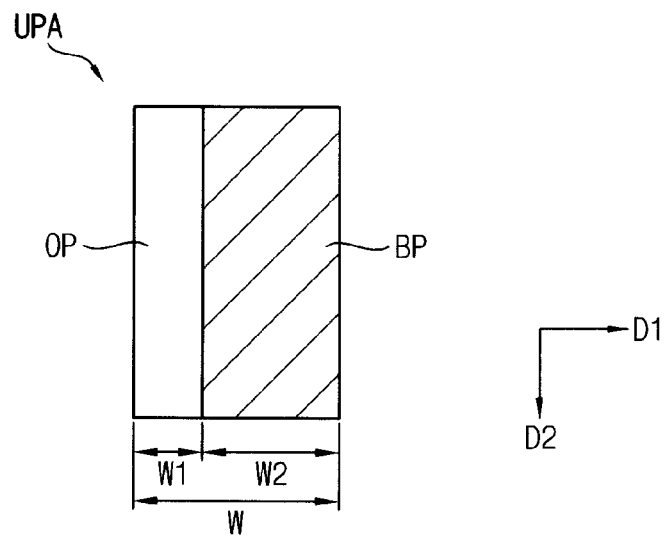
FIG. 12 is a plan view illustrating another exemplary embodiment of a unit pixel of a display panel of a display apparatus according to the invention.

FIG. 12 is a plan view illustrating another exemplary embodiment of a unit pixel of a display panel of a display apparatus according to the invention.

A display apparatus and a method of displaying a 3D image according to the illustrated exemplary embodiment is substantially the same as the display apparatus and the method of displaying the 3D image of the previous exemplary embodiment explained referring to FIGS. 1 to 5 except that the display panel is driven by dividing a single frame into 3 sub frames. Thus, the same reference numerals will be used to refer to the same or like parts as those described in the previous exemplary embodiment of FIGS. 1 to 5 and any repetitive explanation concerning the above elements will be omitted.

The display apparatus according to the illustrated exemplary embodiment includes the display panel 100, the lens plate 200, the display panel driver 300 and the lens driver 400.

The display panel driver 300 drives the display panel 100 by dividing a single frame into N sub frames. In the illustrated exemplary embodiment, N is three.

The display panel driver 300 generates a first image corresponding to a first sub frame, a second image corresponding to a second sub frame and a third image corresponding to a third sub frame based on an input image. The display panel driver 300 provides the first image to the display panel 100 during the first sub frame. The display panel driver 300 provides the second image to the display panel 100 during the second sub frame. The display panel driver 300 provides the third image to the display panel 100 during the third sub frame.

The lens driver 400 is connected to the lens plate 200. The lens driver 400 outputs a signal for driving a plurality of lenses L.

The lens driver 400 disposes the lenses L at a first position during the first sub frame. The lens driver 400 disposes the lenses L at a second position during the second sub frame. The second position is shifted by 1/N of the width of the unit pixel from the first position.

In the illustrated exemplary embodiment, N is three, so that the lens driver 400 moves the lenses L by ⅓ of the width of the unit pixel to dispose the lenses L at the second position during the second sub frame. In addition, the lens driver 400 moves the lenses L by ⅓ of the width of the unit pixel to dispose the lenses L at the third position during the third sub frame.

Referring to FIG. 12, a unit pixel UPA includes the opening portion OP and the blocking portion BP. The blocking portion BP may be adjacent to the opening portion OP in the first direction D1.

The opening portion OP is defined by the color filter of the display panel 100. The blocking portion BP is defined by a black matrix of the display panel 100. The color filter is in the opening portion OP. The black matrix is in the blocking portion BP.

Alternatively, the blocking portion BP may be defined by a barrier or an active barrier on the display panel 100.

The opening portion OP has a first width W1 in the first direction D1. The blocking portion BP has a second width W2 in the first direction D1. The width W of the unit pixel UPA in the first direction D1 is substantially equal to a sum of the first and second widths W1+W2.

An aperture ratio of the unit pixel UPA is defined as a ratio of an area of the opening portion OP to an area of the unit pixel UPA. In the illustrated exemplary embodiment, the aperture ratio of the unit pixel UPA may be defined as a ratio of the first width W1 of the opening portion OP to the width W of the unit pixel UPA. When the display panel 100 is driven by dividing a single frame into N sub frames, the aperture ratio of the unit pixel UPA is adjusted to be 1/N.

In the illustrated exemplary embodiment, N is three, so that the aperture ratio W1/W is ⅓. A ratio between the first width W1 of the opening portion OP and the second width W2 of the blocking portion BP is 1:2.

Figure 13A:
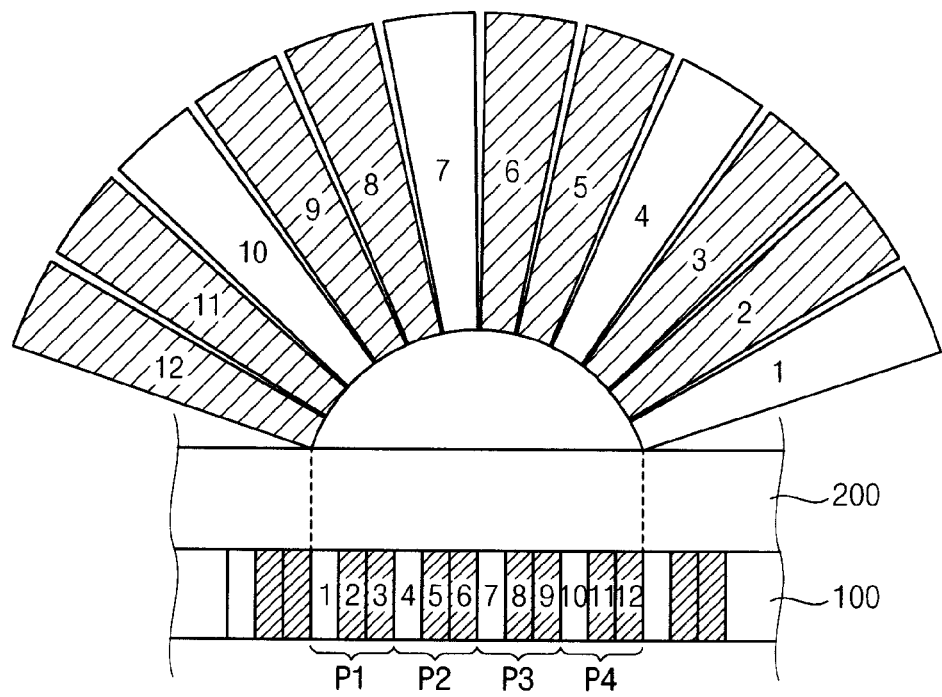
FIG. 13A is a cross-sectional view illustrating an exemplary embodiment of a relative position of the display panel including the unit pixel of FIG. 12 and a lens plate during a first sub frame.
Figure 13B:
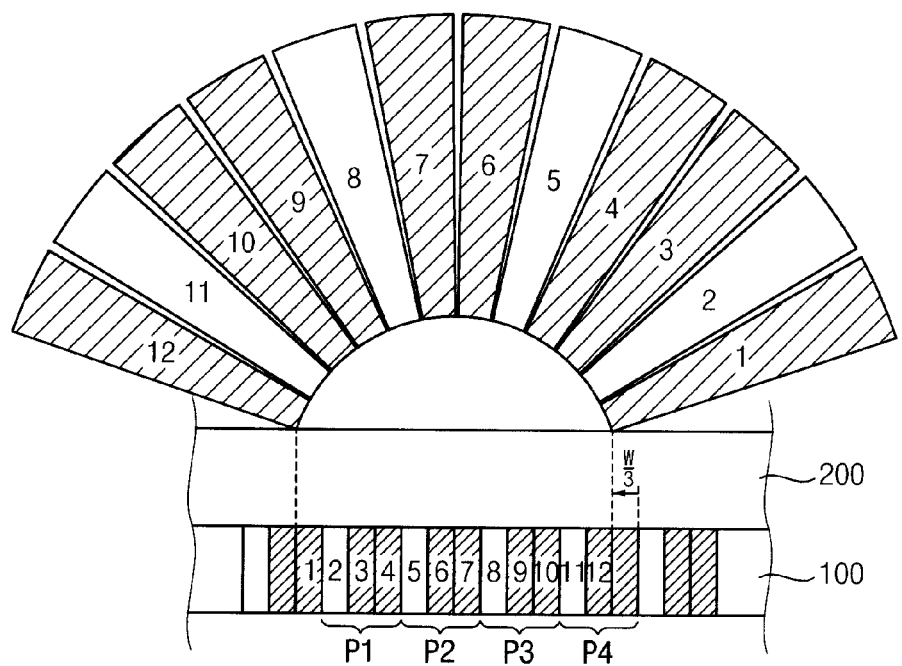
FIG. 13B is a cross-sectional view illustrating an exemplary embodiment of a relative position of the display panel including the unit pixel of FIG. 12 and the lens plate during a second sub frame.
Figure 13C:
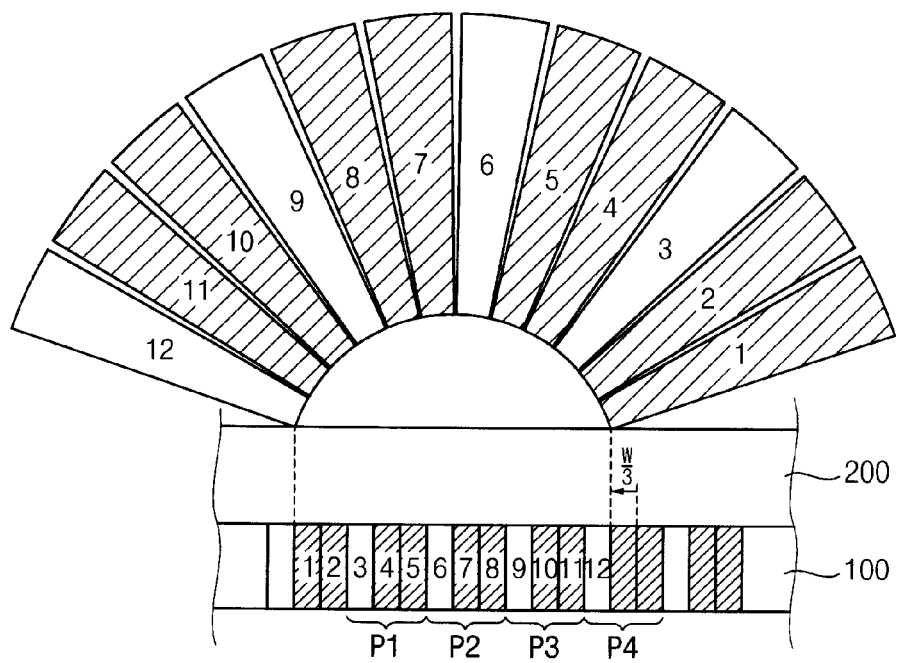
FIG. 13C is a cross-sectional view illustrating an exemplary embodiment of a relative position of the display panel including the unit pixel of FIG. 12 and the lens plate during a third sub frame.

FIG. 13A is a cross-sectional view illustrating an exemplary embodiment of a relative position of the display panel 100 including the unit pixel of FIG. 12 and a lens plate 200 during a first sub frame. FIG. 13B is a cross-sectional view illustrating an exemplary embodiment of a relative position of the display panel 100 including the unit pixel of FIG. 12 and the lens plate 200 during a second sub frame. FIG. 13C is a cross-sectional view illustrating an exemplary embodiment of a relative position of the display panel 100 including the unit pixel of FIG. 12 and the lens plate 200 during a third sub frame.

Referring to FIGS. 12, 13A and 13B, the display panel 100 includes first to fourth pixels P1, P2, P3 and P4. A width of each of the first to fourth pixels P1 to P4 is W. An aperture ratio of each of the first to fourth pixels P1 to P4 is ⅓.

The lens plate 200 is on the display panel 100. A single lens of the lens plate 200 has a width corresponding to a total width of four pixels. The lens has a width corresponding to a width of the first to fourth pixels P1 to P4.

Referring to FIG. 13A, the display panel driver 300 provides the first image to the display panel 100 during the first sub frame. The first image includes first, fourth, seventh and tenth viewpoint images 1, 4, 7 and 10. The first pixel P1 displays the first viewpoint image 1. The second pixel P2 displays the fourth viewpoint image 4. The third pixel P3 displays the seventh viewpoint image 7. The fourth pixel P4 displays the tenth viewpoint image 10.

The lens driver 400 disposes the lens at the first position, which corresponds to a boundary of the first pixel P1 and a boundary of the fourth pixel P4.

Referring to FIG. 13B, the display panel driver 300 provides the second image to the display panel 100 during the second sub frame. The second image includes second, fifth, eighth and eleventh viewpoint images 2, 5, 8 and 11. The first pixel P1 displays the second viewpoint image 2. The second pixel P2 displays the fifth viewpoint image 5. The third pixel P3 displays the eighth viewpoint image 8. The fourth pixel P4 displays the eleventh viewpoint image 11.

The lens driver 400 moves the lens to the second position from the first position to dispose the lens at the second position. The second position is shifted by ⅓ of the width of the unit pixel W/3 from the first position.

Referring to FIG. 13C, the display panel driver 300 provides the third image to the display panel 100 during the third sub frame. The third image includes third, sixth, ninth and twelfth viewpoint images 3, 6, 9 and 12. The first pixel P1 displays the third viewpoint image 3. The second pixel P2 displays the sixth viewpoint image 6. The third pixel P3 displays the ninth viewpoint image 9. The fourth pixel P4 displays the twelfth viewpoint image 12.

The lens driver 400 moves the lens to the third position from the second position to dispose the lens at the third position. The third position is shifted by ⅓ of the width of the unit pixel W/3 from the second position.

Referring to FIGS. 13A to 13C, for example, when a left eye of an observer is at a first viewpoint and a right eye of the observer is at a second viewpoint, the first viewpoint image 1 is viewed to the left eye of the observer through the opening portion during the first sub frame. A black image is viewed to the right eye of the observer by the blocking portion during the first sub frame. The second viewpoint image 2 is viewed to the right eye of the observer through the opening portion during the second sub frame. A black image is viewed to the left eye of the observer by the blocking portion during the second sub frame. A black image is viewed to the right eye of the observer by the blocking portion during the third sub frame. A black image is viewed to the left eye of the observer by the blocking portion during the third sub frame. Thus, the observer may recognize the 3D image by mixing the first viewpoint image 1 of the first sub frame and the second viewpoint image 2 of the second sub frame.

FIG. 14 is a graph illustrating a luminance of the display panel 100 including the unit pixel of FIG. 12 according to a viewing angle during the first to third sub frames.

Referring to FIGS. 13A to 13C and 14, relatively bright images are viewed at the first, fourth, seventh and tenth viewpoints through the opening portion during the first sub frame. The black images are viewed at the second, third, fifth, sixth, ninth, eleventh and twelfth viewpoints by the blocking portion during the first sub frame.

Relatively bright images are viewed at the second, fifth, eighth and eleventh viewpoints through the opening portion during the second sub frame. The black images are viewed at the first, third, fourth, sixth, seventh, ninth, tenth and twelfth viewpoints by the blocking portion during the second sub frame.

Relatively bright images are viewed at the third, sixth, ninth and twelfth viewpoints through the opening portion during the third sub frame. The black images are viewed at the first, second, fourth, fifth, seventh, eighth, tenth and eleventh viewpoints by the blocking portion during the third sub frame.

In FIG. 12, the ratio between the first width W1 of the opening portion OP and the second width W2 of the blocking portion BP is 1:2, so that the relatively bright image and the black image are repeated in a ratio of 1:2 at each of the viewpoints. Accordingly, the display apparatus of the illustrated exemplary embodiment displays the 3D image like a display apparatus using a shutter glass, which repeatedly turns on a left eye, turns on a right eye and turns off left and right eyes. Thus, the display apparatus of the illustrated exemplary embodiment may reduce or effectively prevent the crosstalk where a left image is shown in a right eye or a right image is shown in a left eye.

In addition, an average of a luminance of the first image during the first sub frame and a luminance of the second image during the second sub frame is substantially uniform at any viewpoints, so that the display apparatus of the illustrated exemplary embodiment may reduce or effectively prevent the moiré where a luminance of the display panel 100 is not uniform according to the viewpoint.

According to the exemplary embodiments of the invention as explained above, the number of viewpoints of the 3D image may be increased by the temporal dividing driving method. Thus, the display quality of the 3D image and the viewing angle of the display apparatus may be improved.

In addition, the aperture of the unit pixel is adjusted according to the temporal dividing driving method so that the crosstalk and the moiré may be reduced or effectively prevented. Thus, the display quality of the 3D image may be improved.

The foregoing is illustrative of the invention and is not to be construed as limiting thereof. Although a few exemplary embodiments of the invention have been described, those skilled in the art will readily appreciate that many modifications are possible in the exemplary embodiments without materially departing from the novel teachings and advantages of the invention. Accordingly, all such modifications are intended to be included within the scope of the invention as defined in the claims. In the claims, means-plus-function clauses are intended to cover the structures described herein as performing the recited function and not only structural equivalents but also equivalent structures. Therefore, it is to be understood that the foregoing is illustrative of the invention and is not to be construed as limited to the specific exemplary embodiments disclosed, and that modifications to the disclosed exemplary embodiments, as well as other exemplary embodiments, are intended to be included within the scope of the appended claims. The invention is defined by the following claims, with equivalents of the claims to be included therein.

What is claimed is:

1. A display apparatus comprising:
 a display panel including a plurality of unit pixels and driven by dividing a single frame into N sub frames, N being a natural number;
 a lens plate on the display panel and including a plurality of lenses which convert a two dimensional image displayed on the display panel into a three dimensional image; and
 a lens driver connected to the lens plate, wherein the lens driver disposes the lenses at a first position during a first sub frame, and moves the lenses to a second position from the first position and disposes the lenses at the second position during a second sub frame, the second position being shifted by 1/N of a width of a unit pixel from the first position when the single frame is divided into N sub frames.

2. The display apparatus of claim 1, wherein
 the unit pixel includes an opening portion and a blocking portion, and
 an aperture ratio of the unit pixel, which is defined as a ratio of a width of the opening portion to the width of the unit pixel, is 1/N.

3. The display apparatus of claim 2, wherein
 the opening portion and the blocking portion alternate in a horizontal direction of the display panel, and
 the opening portion and the blocking portion alternate in a vertical direction of the display panel.

4. The display apparatus of claim 2, wherein
 the opening portion and the blocking portion alternate in a horizontal direction of the display panel, and
 a group of opening portions and a group of blocking portions alternate in a vertical direction of the display panel.

5. The display apparatus of claim 2, wherein the display panel further includes:
 a color filter in the opening portion, and
 a black matrix in the blocking portion.

6. The display apparatus of claim 2, further comprising a barrier part between the display panel and the lens plate, the barrier part including a plurality of barriers, and
 wherein
 the display panel further includes a color filter in the opening portion of the unit pixel, and
 a barrier overlaps the blocking portion of the unit pixel.

7. The display apparatus of claim 1, wherein an extending direction of the lens is substantially parallel to a longitudinal direction of the unit pixel.

8. The display apparatus of claim 7, wherein a moving direction of the lenses is substantially perpendicular to the extending direction of the lens.

9. The display apparatus of claim 7, wherein a width of the lens corresponds to a total width of the unit pixels.

10. The display apparatus of claim 1, wherein
 the lens plate is a liquid crystal lens panel, and
 the lens is an electric field which is applied to the liquid crystal lens panel.

11. A display apparatus comprising:
 a display panel including a plurality of unit pixels and driven by dividing a single frame into N sub frames, N being a natural number;

a lens plate on the display panel and including a plurality of lenses which convert a two dimensional image displayed on the display panel into a three dimensional image;

an active barrier part between the display panel and the lens plate, the active barrier part including a plurality of active barriers, and a barrier driver connected to the active barrier part, wherein the barrier driver disposes the active barriers at a first position during a first sub frame, and moves the active barriers to a second position from the first position and disposes the active barriers at the second position during a second sub frame, the second position being shifted by 1/N of a width of a unit pixel from the first position when the frame is divided into N sub frames.

12. The display apparatus of claim 11, wherein
the unit pixel includes an opening portion and a blocking portion, and
an aperture ratio of the unit pixel, which is defined as a ratio of a width of the opening portion to the width of the unit pixel, is 1/N.

13. The display apparatus of claim 12, wherein
the display panel further includes a color filter is in the opening portion of the unit pixel, and
an active barrier overlaps the blocking portion of the unit pixel.

14. A method of displaying a three dimensional image, the method comprising:

providing a first image to a display panel during a first sub frame and a second image to the display panel during a second sub frame, the display panel including a plurality of unit pixels, and driving the display panel by dividing a single frame into N sub frames, N being a natural number;

disposing a plurality of lenses at a first position during the first sub frame, wherein the lenses convert the first image into a first three dimensional image, the lenses being on the display panel; and moving the lenses to a second position from the first position and disposing the lenses at the second position during the second sub frame, wherein the lenses convert the second image into a second three dimensional image, the second position being shifted by 1/N of a width of a unit pixel from the first position when the single frame is divided into N sub frames.

15. The method of claim 14, wherein
the unit pixel includes an opening portion and a blocking portion, and
an aperture ratio of the unit pixel, which is defined as a ratio of a width of the opening portion to the width of the unit pixel, is 1/N.

16. The method of claim 15, wherein the display panel further includes:
a color filter in the opening portion, and
a black matrix in the blocking portion.

17. The method of claim 15, further comprising disposing a barrier part between the display panel and the lens plate, the barrier part including a plurality of barriers,
wherein
the display panel further includes a color filter in the opening portion of the unit pixel, and
a barrier overlaps the blocking portion of the unit pixel.

18. A method of displaying a three dimensional image, the method comprising:

providing a first image to a display panel during a first sub frame and a second image to the display panel during a second sub frame, the display panel including a plurality of unit pixels, and driving the display panel by dividing a single frame into N sub frames, N being a natural number;

disposing a plurality of active barriers at a first position during the first sub frame such that the first image is converted into a first three dimensional image, the active barriers being disposed between the display panel, and a plurality of lenses on the display panel; and moving the active barriers to a second position from the first position and disposing the active barriers at the second position during the second sub frame such that the second image is converted into a second three dimensional image, the second position being shifted by 1/N of a width of a unit pixel from the first position.

19. The method of claim 18, wherein
the unit pixel includes an opening portion and a blocking portion, and
an aperture ratio of the unit pixel, which is defined as a ratio of a width of the opening portion to the width of the unit pixel, is 1/N.

20. The method of claim 19, wherein
the display panel further includes a color filter in the opening portion of the unit pixel, and
an active barrier overlaps the blocking portion of the unit pixel.

* * * * *